June 13, 1950 W. S. BACHMAN 2,511,663

MAGNETIC PHONOGRAPH PICKUP

Filed Dec. 29, 1945

Inventor:
William S. Bachman,
by Merton D Morse
His Attorney.

Patented June 13, 1950

2,511,663

UNITED STATES PATENT OFFICE 2,511,663

MAGNETIC PHONOGRAPH PICKUP

William S. Bachman, Southport, Conn., assignor to General Electric Company, a corporation of New York Application December 29, 1945, Serial No. 638,378

22 Claims. (Cl. 179—100.41)

Figures 1, 2, 3:
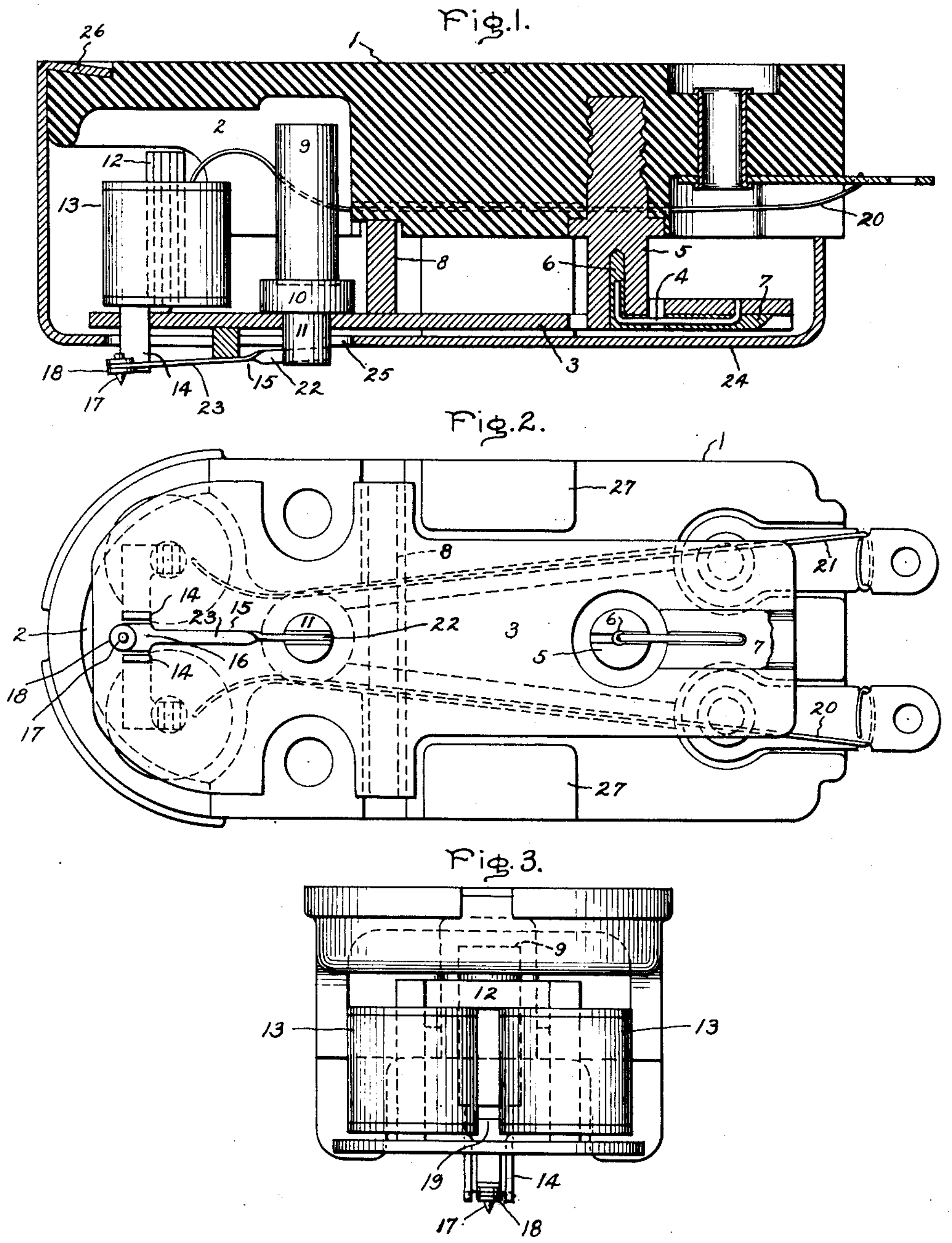

My invention relates to vibration translating devices and particularly to phonograph pickups.

Phonograph pickups have been constructed in the past with a wide variety of vibration sensitive elements or transducers for converting the vibrations produced by the stylus point as it travels in the sound track or groove into corresponding electrical variations. One type of transducer employs a variable resistance element which changes the flow of current through the circuits of the apparatus in accordance with the mechanical vibration. Another form employs a voltage generating element, such as a piezoelectric crystal or an electromagnetic generator. The quality of performance of phonograph pickups has been improved steadily; however, there has been a continued effort to reduce the mass of the moving or vibrating system and to simplify the mechanical construction with a view to obtaining more accurate reproduction of the recorded sounds and to the elimination of objectionable noise, such as needle-scratch. Accordingly it is an object of my invention to provide a phonograph pickup including an improved arrangement of the vibrating components thereof for minimizing the effects of undesired vibrations.

It is another object of my invention to provide a phonograph pickup including an improved arrangement and construction of the vibrating parts which shall enable the stylus point more precisely to follow the record sound track.

It is another object of my invention to provide a phonograph pickup of the electromagnetic type including an improved arrangement of the parts of the electromagnetic circuit for securing more linear reproduction of the recorded sounds.

A further object of my invention is to provide a phonograph pickup of the electromagnetic type including an improved arrangement for maintaining the load on the stylus point within a predetermined range.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 is a sectional side elevation view of a phonograph pickup embodying my invention; Fig. 2 is a bottom plan view of the pickup shown in Fig. 1 with the cover removed; and Fig. 3 is an end view of the pickup with the cover removed.

Briefly, the phonograph pickup shown on the drawing is of the electromagnetic type and comprises a head or body of insulating material from which is suspended a nonmagnetic plate carrying the stylus member and its associated voltage generating element. A plate is secured on the head and is resiliently held in a normal position by a single wire spring and low velocity vibrations of the plate are damped by a mass of plastic damping material spaced from the spring and arranged between the plate and the head. The generating element comprises a magnetic circuit including a small permanent magnet and a pair of coils on a rectangular core structure mounted on the end of the plate remote from the spring mounting. The stylus member is a resilient strap mounted as a cantilever beam and carrying a stylus point located adjacent the pole pieces of the magnetic core. A second block of plastic damping material is arranged between the stylus member and the carrier plate to damp vibrations of the stylus member in its second mode of vibration. The construction is such that a very light unbalanced weight is required and unbalanced weights greater than a predetermined amount result in contact between the magnetic pole pieces and the record and prevent overstressing of the stylus member. The entire mechanism except the stylus member is enclosed within a casing of high permeability material to minimize the effect of external magnetic fields.

Referring now to the drawing, the pickup illustrated in the three figures thereof comprises a block 1 having a recess 2 formed in its forward end. A carrier plate or member 3 of suitable nonmagnetic material, such as brass, is resiliently secured to the block 1 by a single length of spring wire 4 which has its ends bent up and secured to the carrier plate 3 and to a nonmagnetic metal post 5 secured in the head 1. The spring 4 is soldered to the post 5 within a recess or drill hole, as indicated at 6, and is also soldered to the plate 3, as indicated at 7. The spring 4 determines the normal position of the carrier plate with respect to the head 1. It is desirable to damp low velocity movements of the plate 3 and for this purpose a mass or block of plastic damping material 8 is secured between the plate and the head 1 near the center of the plate. Any suitable damping material may be employed, one such material being a cellulose nitrate plastic. A phonograph pickup including one type of construction for utilizing a spring and a damping device in mechanical parallel relationship for positioning a stylus carrier with respect to a pickup head is described and claimed in my copending application Serial No. 638,379, filed December 29, 1945, and assigned to the same assignee as the present invention. The electromagnetic voltage generator of the pickup is carried by the plate 3 on its left end, as viewed in Fig. 1, remote from the spring mounting 4. The electromagnetic system includes an upright permanent bar magnet 9 mounted in a magnetic fixture or base 10 secured to the plate 3 and having a reduced portion 11 passing through the plate 3 and extending from the lower side thereof. A rectangular magnetic core 12 is mounted near the end of the plate 3 and coils 13 are mounted on the two upright portions of the core. The core structure is provided with downwardly extending pole pieces 14 which project downwardly from the plate 3. A stylus member 15 in the form of a twisted ribbon of suitable resilient magnetic material is rigidly secured at one end to the magnetic post 11 and has its other end located adjacent and spaced from the pole pieces 14. This end, as indicated at 16, is enlarged somewhat and is provided with a stylus point 17 which in the drawing has been illustrated as a separate point mounted in a boss or collar 18 secured to the stylus member, it being understood that any suitable arrangement of the stylus point may be employed. It will thus be seen that the stylus member 15, which is made of magnetic material, forms a portion of the magnetic path between the magnet 9 and the core 12. I have found it unnecessary to provide a magnetic core member between the upright ends of the upright core 12 and the magnet 9. The portion 16 of the stylus member is centered in the air gap between the pole pieces 14 and when the stylus is vibrated upon engagement with the groove of a sound record the vibrations of the stylus produce corresponding changes in the flux passing through the portions of the core member 12 within the two coils 13. When the stylus member is in its midposition, as shown in Fig. 2, substantially the same amount of flux passes through both cores; however, as soon as the stylus is displaced toward one of the cores a greater amount of flux flows in that core than in the other, there being an increase of flux in the one core and a decrease in the other. It will thus be seen that the change of flux through the two cores is in opposite directions, one increasing and the other decreasing. The coils 13 are connected together as indicated at 19 and are connected in series in the electrical circuit by leads 20 and 21. The coils 13 are connected by means of leads 20 and 21 in a suitable amplifying circuit (not shown). The stylus member 15 comprises a first portion 22 the wide portion of which is upright and is connected to the post 11. This portion provides lateral compliance. The other portion of the stylus, indicated at 23, has its main cross section axis at right angles to that of the portion 22 and provides vertical compliance. A small block of cellulose nitrate plastic or similar material just forward of the twist between the portions 22 and 23 provides sufficient damping to restrain the second mode of vibration of the stylus member 15 which constitutes a cantilever beam. The motion of the stylus 17, as will be observed, is transmitted directly to the armature of the magnetic system, that is, to the portion 16 of the stylus member. Thus no undesired frequency characteristics are introduced as might be the case were it necessary to provide an additional linkage between the stylus and the armature. It is therefore necessary only that the stylus properly traces the groove in the sound record in order to provide an output voltage which is proportional to the stylus velocity. When the stylus is loaded within a predetermined range, for example with an unbalanced load on the stylus of the order of one-half ounce, the characteristics of the system are linear and the stylus follows the sound track accurately. Should the loading become excessive for any reason, as for example if the pickup head is hit or dropped, the stylus point will recede between the pole pieces 14, which will then strike the surface of the record and prevent further stressing of the stylus. The stylus is thus protected from damage and from overloading.

The mounting arrangement described above is such that the stylus point, and hence the armature which is inseparably connected thereto, follows the sound track accurately with minimum interference due to vibration in the second mode of vibration of the stylus member and also without interference at low frequencies within the range of the tone arm resonance. The carrier plate 3 is restrained by the damping member 8 at all useful audio frequencies and thus motion of the stylus tip 17 imparted by the record sound track causes the armature 16 to be vibrated in accordance with that motion, thereby changing the reluctance of the magnetic paths to the two poles of the magnetic structure. The block 8 serves as a damper at the resonant frequency of the tone arm (not shown) which is normally rigidly secured to the block 1. The spring 4 centers the entire magnetic assembly and determines the working point of the material of the block 8, which in the absence of sufficient restraining force it not effective to reliably maintain a uniform location of the carrier member 3. The armature 16 centers itself because of the resilience of the cantilever beam of the stylus member. Thus the armature 16 is spring mounted to the magnet structure and the magnet structure is spring mounted to the head 1 and hence to the tone arm. The compliance of the spring 4 is relatively large; that is, the spring is a rather soft spring so that the damping block 8 is bypassed as little as possible. The mass of the magnetic structure and carrier 3 is made as small as possible.

By suitable proportioning of the magnetic structure and armature, highly linear reproduction may be secured and the normally inherent nonlinearity of the magnetic pickup is effectively eliminated. As illustrated in the drawing, the pole pieces 14 are of considerably reduced cross section with respect to the remaining portions of the core structure 12, the cross sections of the pole pieces being not very much greater than the cross section of the armature 16. Very small clearances may be employed between the pole pieces 14 and the sides of the armature 16. The entire magnetic structure is enclosed in a case or housing 24 constructed of a material of high permeability which acts as a shield and minimizes disturbance from external magnetic fields. The shield 24 is provided with a suitable opening 25 through which the stylus member 15 and ends of the posts 11 and pole pieces 14 protrude. The shield 24 is secured on the head 1 by suitable tabs which are bent over the head 1, as indicated by the forward tab shown at 26. In order to limit the lateral movement of the carrier member 3, blocks or abutments 27 are provided on the head 1 extending downwardly adjacent both sides of the carrier member so that they are in the path of lateral movement of the carrier.

During the operation of the pick up illustrated, the stylus 17 is placed in the sound track of a record and vibrates the armature 16 in accordance with the recorded sounds. The variation of the reluctance of the paths between the armature 16 and the two pole pieces 14 produces corresponding changes in the flux flowing through the two upright portions of the core structure 12. The direction of the voltage generated by the two coils in series is determined by the coil toward which the armature moves, the two coils being arranged in bucking relation in the circuit. It will thus be apparent that the voltage generated follows the vibrations of the sound track and by amplifying this voltage the recorded sounds may be reproduced by suitable apparatus in the usual manner. Should pressure greater than the normal range of pressure required for maintaining the stylus in its desired position be exerted on the head, the pole pieces 14 will engage the surface of the record and prevent further stressing of the stylus. The pole pieces are also effective to prevent damage to the stylus in the event the pickup is dropped on the record.

While I have described a particular embodiment of my invention, other applications and arrangements will readily occur to those skilled in the art. I do not therefore desire my invention to be limited to the specific construction illustrated and described and I intend by the accompanying claims to cover all modifications within the spirit and scope of my invention.

What I claim as new and desire to secure by Letters Patent of the United States is:

1. A phonograph pickup comprising a supporting head, a nonmagnetic carrier member spaced from said head, a spring connecting said member and said head for holding said member in a predetermined normal position with respect to said head, damping means connected between said head and said member at a predetermined distance from said spring for damping movement of said member with respect to said head at low frequencies, and means including a resilient stylus member secured to said carrier member and arranged to be vibrated upon engagement with a record sound track for producing electrical impulses corresponding to the recorded sounds.

2. A phonograph pickup comprising a supporting head, a nonmagnetic carrier member spaced from said head, a spring connecting said member and said head for holding said member in a predetermined normal position with respect to said head, a first damping means connected between said head and said member at a predetermined distance from said spring for damping movement of said member with respect to said head at low frequencies, means including a stylus member secured to said carrier as a cantiliver beam and having a stylus point at its outer end arranged to be vibrated upon engagement with a record sound track for producing electrical impulses corresponding to the recorded sounds, and a second damping means engaging said carrier and said stylus member for damping movement of said stylus member in its second mode of vibration.

3. A phonograph pickup comprising a supporting head, a nonmagnetic carrier member spaced from said head, a single straight length of spring wire connecting said member and said head for holding said member in a predetermined normal position with respect to said head, a damping means connected between said head and said member at a predetermined distance from said spring for damping movement of said member with respect to said head at low frequencies, and means including an elongated stylus member secured to said carrier member and arranged to be vibrated upon engagement with a record sound track for producing electrical impulses corresponding to the recorded sounds, said stylus member extending longitudinally in substantially the same direction as said spring.

4. A phonograph pickup comprising a supporting head, a nonmagnetic carrier member spaced from said head, a spring for securing said member to said head and for holding said member in a predetermined normal position with respect to said head, means for damping low velocity movement of said member with respect to said head, a magnetic stylus member secured to said carrier member at one end and having a stylus point near its other end, a magnetic core structure mounted on said carrier member and having pole pieces spaced from and adjacent said stylus member on either side of said point, a coil on said core structure, and a permanent magnet mounted on said carrier member for producing magnetic flux in said core structure, said stylus member upon vibration between said pole pieces producing variations of said flux proportional to such vibrations and inducing corresponding voltages in said coil.

5. A phonograph pickup comprising a supporting head, a nonmagnetic carrier spaced from said head, a spring near one end of said carrier for securing said carrier to said head and for holding said carrier in a predetermined normal position with respect to said head, means for damping low velocity movement of said carrier with respect to said head, a permanent magnet rigidly secured to said carrier, a magnetic core structure mounted on said carrier and spaced from said magnet on the side of said magnet remote from said spring, said core structure including a pair of spaced pole pieces mounted on said carrier, a magnetic stylus member secured to said carrier adjacent said magnet and having its opposite end provided with a stylus point and arranged between and spaced from said pole pieces, and a coil on said core structure arranged to produce voltage variations corresponding to vibrations of said stylus member between said pole pieces, said stylus member constituting a portion of the path for the flux between said magnet and said pole pieces.

6. A phonograph pickup comprising a supporting head, a nonmagnetic carrier spaced from said head, a spring near one end of said carrier for securing said carrier to said head and for holding said carrier in a predetermined normal position with respect to said head, means for damping low velocity movement of said carrier with respect to said head, an upright bar magnet rigidly secured to said carrier, a magnetic core structure comprising two upright core members mounted on said carrier and spaced from said magnet on the side of said magnet remote from said spring, said core structure including a pair of spaced pole pieces, a magnetic stylus member secured to said carrier adjacent said magnet and having its opposite end provided with a stylus point and arranged between and spaced from said pole pieces, and a coil on said core structure arranged to produce voltage variations corresponding to vibrations of said stylus member between said pole pieces, said stylus member constituting a magnetic link between one end of said magnet and the corresponding ends of said core members.

7. A phonograph pickup comprising a supporting head, a nonmagnetic carrier spaced from said head, a spring for securing said carrier to said head and for holding said carrier in a predetermined normal position with respect to said head, means for damping low velocity movement of said carrier with respect to said head, a magnetic stylus member secured to said carrier at one end and having a stylus point near its other end, said stylus member comprising one portion adjacent said carrier providing compliance laterally with respect to said head and a second portion providing compliance at right angles to that of said one portion, a magnetic core structure mounted on said carrier and having pole pieces spaced from and adjacent said stylus member on either side of said point, said pole pieces constituting a guard arranged to engage the surface of a sound record for limiting the force which may be exerted on said stylus member, a coil on said core structure, and a permanent magnet mounted on said carrier for producing magnetic flux in said core structure, said stylus member upon vibration between said pole pieces producing variations of said flux proportional to the vibrations and inducing corresponding voltages in said coil.

8. A phonograph pickup comprising a supporting head, a nonmagnetic carrier spaced from said head, a spring for securing said carrier to said head and for holding said carrier in a predetermined normal position with respect to said head, means for damping low velocity movement of said carrier with respect to said head, a magnetic stylus member secured to said carrier at one end and having a stylus point near its other end, said stylus member comprising a twisted ribbon of spring material having a first portion adjacent said carrier providing horizontal compliance and a second portion in a plane at right angles to that of said first portion and extending toward the end of said member to provide vertical compliance, a magnetic core structure mounted on said carrier and having pole pieces spaced from and adjacent said stylus member on either side of said point, said pole pieces constituting a guard arranged to engage the surface of a sound record for limiting the force which may be exerted on said stylus member, a coil on said core structure, and a permanent magnet mounted on said carrier for producing magnetic flux in said core structure, said stylus member upon vibration between said pole pieces producing variations of said flux proportional to the vibrations and inducing corresponding voltages in said coil.

9. A phonograph pickup comprising a supporting head of nonmagnetic material, a post on said head near one end thereof, a nonmagnetic carrier plate spaced from said head, a spring for securing said plate to said post to hold said plate in a predetermined normal position with respect to said head, means arranged between said plate and said head intermediate said post and the other end of said head for damping low velocity movement of said plate, a permanent magnet mounted on said plate, a magnetic core structure mounted on said plate near the end thereof remote from said spring and having a pair of spaced pole pieces projecting from said plate, a magnetic stylus member secured to said plate and having one end adjacent said magnet and its other end provided with a stylus point and arranged between and spaced from said pole pieces, and means including a coil on said core structure for producing voltage variations corresponding to vibrations of said stylus point.

10. A phonograph pickup comprising a supporting head of nonmagnetic material having a recess near one end thereof, a post on said head near the other end thereof, a nonmagnetic carrier plate spaced from said head, a spring for securing said plate to said post to hold said plate in a predetermined normal position with respect to said head, means arranged between said plate and said head intermediate said post and said recess for damping low velocity movement of said plate, an upright bar magnet mounted on said plate and extending into said recess, an upright magnetic core structure mounted near the end of said plate in spaced relation to said magnet and extending into said recess, said core structure having a pair of spaced pole pieces projecting downwardly from said plate, a magnetic stylus member secured to said plate and having one end adjacent said magnet and its other end provided with a stylus point and arranged between and spaced from said pole pieces, means including a coil on said core structure for producing voltage variations corresponding to vibrations of said stylus point, and a cover of high permeability material secured to said head and enclosing said plate, said cover having an opening adjacent said stylus member and through which said stylus and projections protrude.

11. A phonograph pickup comprising a supporting head of nonomagnetic material, a post on said head near one end thereof, a nonmagnetic carrier plate spaced from said head and having an opening for accommodating said post in spaced relation thereto, a single straight length of spring wire rigidly secured to said post and to said carrier and extending toward said one end of said head for holding said carrier in a predetermined normal position with respect to said plate, a mass of plastic damping material arranged between said plate and said head intermediate said post and the other end of said head for damping low velocity movement of said plate, a permanent magnet mounted on said plate, a magnetic core structure mounted on said plate near the end thereof remote from said spring and having a pair of spaced pole pieces projecting from said plate, a magnetic stylus member secured to said plate at one end and having a stylus point at its other end, said stylus member adjacent said point being arranged between and spaced from said pole pieces, and means including a coil on said core structure for producing voltage variations corresponding to vibrations of said stylus point.

12. A phonograph pickup comprising a supporting head, a carrier member, a spring and damping means connected in parallel relationship between said member and said head for positioning said member on said head and for damping low velocity movement of said member, a resilient stylus member secured to said carrier member and extending therefrom as a cantilever beam, said stylus member having a stylus point at its end remote from said carrier member and adapted to engage the sound track of a record, and means spaced from said stylus member and mounted on said carrier member for converting vilbration of said stylus member to electric current variations.

13. A phonograph pickup comprising a supporting head, a carrier member, a single length of spring wire and a mass of plastic material connected in spaced parallel relationship between said member and said head for positioning said member on said head and for damping low velocity movement of said member, said spring being arranged between said head and said member near one end of said member and said mass of material being arranged between said head and said member near the central portion of said member, a resilient stylus member secured to said carrier member and extending therefrom as a cantilever beam, said stylus member having a stylus point at its end remote from said carrier member and adapted to engage the sound track of a record, a second mass of plastic material connected between said carrier member and said stylus member for damping vibration of said stylus member in its second mode of vibration, and means mounted on said carrier member for converting vibration of said stylus member to electric variations.

14. A phonograph pickup comprising a supporting head, a carrier member, a single length of spring wire and a mass of plastic material connected in spaced parallel relationship between said member and said head for positioning said member on said head and for damping low velocity movement of said member, said mass of material being arranged between said head and said member near the central portion of said member, a resilient stylus member secured to said carrier member and extending therefrom as a cantilever beam, said stylus member having a stylus point at its end remote from said carrier member and adapted to engage the sound track of a record, and means for converting vibrations of said stylus member to electric variations.

15. A phonograph pickup comprising a carrier member, a magnetic core structure mounted on said member and having a pair of pole pieces extending downwardly from said member, a permanent magnet mounted on said member and spaced from said core structure, a resilient stylus member of magnetic material secured at one end adjacent said magnet and having a stylus point at its other end, said stylus member being arranged to retain said stylus point between said pole pieces in spaced relationship therewith whereby said stylus member forms a portion of a magnetic circuit including said structure and said magnet, said circuit having a wide air gap between said core structure and the end of said magnet remote from said stylus member, and a coil on said core structure for converting vibrations of said stylus member to electric current variations.

16. A phonograph pickup comprising a supporting head, a carrier member, a spring and damping means connected in parallel relationship between said member and said head for positioning said member on said head and for damping low velocity movement of said member, a magnetic core structure mounted on said member and having a pair of pole pieces extending downwardly from said member, a permanent magnet mounted on said member and spaced from said core structure, a resilient stylus member of magnetic material secured at one end adjacent said magnet and having a stylus point at its other end, said stylus member being arranged to retain said stylus point between said pole pieces in spaced relationship therewith whereby said stylus member forms a portion of a magnetic circuit including said structure and said magnet, said circuit having a wide air gap between said core structure and the end of said magnet remote from said stylus member, and a coil on said core structure for converting vibrations of said stylus member to electric current variations.

17. A phonograph pick-up comprising a supporting head, a carrier member, a spring and damping means connected in parallel relationship between said member and said head for positioning said member on said head and for damping low velocity movement of said member, a resilient stylus member secured to said carrier member and extending therefrom as a cantilever beam, said stylus member comprising a twisted ribbon of spring material having a first portion providing horizontal compliance and a second portion in a plane at right angles to that of said first portion for providing vertical compliance, said stylus member having a stylus point at its end remote from said carrier member and adapted to engage the sound track of a record, and means spaced from said stylus member and mounted on said carrier member for converting vibration of said stylus member to electric current variations.

18. A phonograph pickup comprising a rigid member, a stylus member of resilient material secured to said rigid member and extending therefrom as a single cantilever beam, said stylus member comprising a twisted ribbon of spring material having a first portion providing horizontal compliance and a second portion in a plane at right angles to that of said first portion for providing vertical compliance, said stylus member having a stylus point at its end remote from said rigid member and adapted to engage the sound track of a record, and means for converting vibration of said stylus member to electric current variations.

19. A phonograph pickup comprising a carrier member, a magnetic core structure mounted on said member and having a pair of pole pieces extending downwardly from said member, a permanent magnet mounted on said member and spaced from said core structure, a stylus member secured at one end adjacent said magnet and extending therefrom as a single cantilever beam, said stylus member having a record-engaging stylus point at its free other end, said stylus member comprising a twisted resilient ribbon of magnetic material having a first portion providing horizontal compliance and a second portion in a plane at right angles to that of said first portion for providing vertical compliance, said stylus member being arranged to retain said stylus point between said pole pieces in spaced relationship therewith whereby said stylus member forms a portion of a magnetic circuit including said core structure and said magnet, and a coil on said core structure for converting vibrations of said stylus point to electric current variations.

20. A phonograph pickup comprising a carrier member, a magnetic core structure mounted on said member and having a pair of pole pieces extending downwardly from said member, a permanent magnet mounted on said member and spaced from said core structure, a stylus member secured at one end adjacent said magnet and extending therefrom as a single centilever beam, said stylus member having a record-engaging stylus point at its other end, said stylus member comprising a twisted resilient ribbon of magnetic material having a first portion providing horizontal compliance and a second portion in a plane at right angles to that of said first portion for providing vertical compliance, said stylus member being arranged to retain said stylus point between said pole pieces in spaced relationship therewith whereby said stylus member forms a portion of a magnetic circuit including said core structure and said magnet, means whereby said pole pieces constitute a guard arranged to engage the surface of a sound record for limiting the force which may be exerted on said stylus point, and a coil on said core structure for converting vibrations of said stylus point to electric current variations.

21. A phonograph pickup comprising a carrier member, a magnetic core structure mounted on said member and having a pair of pole pieces extending downwardly from said member, a permanent magnet mounted on said member and spaced from said core structure, a stylus member secured at one end adjacent said magnet and extending therefrom as a single cantilever beam, said stylus member having a record-engaging stylus point at its other end, said stylus member comprising a twisted resilient ribbon of magnetic material having a first portion providing horizontal compliance and a second portion in a plane at right angles to that of said first portion for providing vertical compliance, said stylus member being arranged to retain said stylus point between said pole pieces in spaced relationship therewith whereby said stylus member forms a portion of a magnetic circuit including said core structure and said magnet, said circuit having a wide air gap between said core structure and the end of said magnet remote from said stylus member, and a coil on said core structure for converting vibrations of said stylus point to electric current variations.

22. A phonograph pickup comprising a carrier member, a magnetic core structure supported by said member and having a pair of pole pieces extending downwardly from said member, a permanent magnet supported by said member and spaced from said pole pieces, a stylus member secured at one end adjacent said magnet and extending therefrom as a single cantilever beam, said stylus member having a record-engaging stylus point at its free other end, said stylus member comprising a twisted resilient ribbon of magnetic material having a first portion providing horizontal compliance and a second portion in a plane at right angles to that of said first portion for providing vertical compliance, said stylus member extending between said magnet and said pole pieces to form a portion of a magnetic circuit including said core structure and said magnet, the free end of said stylus member being positioned between said pole pieces with its broad face in a horizontal plane to define air gaps between the edges of said free end and said pole pieces, and a coil on said core structure for converting vibrations of said stylus point to electric current variations.

WILLIAM S. BACHMAN.

REFERENCES CITED

The following references are of record in the file of this patent:

UNITED STATES PATENTS

| Number | Name | Date |
|---|---|---|
| 2,038,687 | Sykes | Apr. 28, 1936 |
| 2,110,092 | Norton | Mar. 1, 1938 |
| 2,113,907 | Sykes | Apr. 12, 1938 |
| 2,239,717 | Hunt | Apr. 27, 1941 |
| 2,388,116 | Bruderlin | Oct. 30, 1945 |
| 2,422,817 | Baker | June 24, 1947 |

FOREIGN PATENTS

| Number | Country | Date |
|---|---|---|
| 764,896 | France | May 29, 1934 |